(12) United States Patent
Fujimoto

(10) Patent No.: US 8,387,742 B2
(45) Date of Patent: Mar. 5, 2013

(54) VEHICULAR STEERING DEVICE

(75) Inventor: Masaki Fujimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 770 days.

(21) Appl. No.: 12/601,849

(22) PCT Filed: Aug. 6, 2008

(86) PCT No.: PCT/JP2008/064495
§ 371 (c)(1),
(2), (4) Date: Nov. 25, 2009

(87) PCT Pub. No.: WO2009/020230
PCT Pub. Date: Feb. 12, 2009

(65) Prior Publication Data
US 2010/0175491 A1    Jul. 15, 2010

(30) Foreign Application Priority Data

Aug. 9, 2007   (JP) ................. 2007-207370

(51) Int. Cl.
*B62D 5/22* (2006.01)
(52) U.S. Cl. ............... 180/427; 180/428; 180/444
(58) Field of Classification Search ............ 180/427, 180/428, 444; 74/498
See application file for complete search history.

(56) References Cited

U.S. PATENT DOCUMENTS

| | | | | |
|---|---|---|---|---|
| 3,157,061 A | * | 11/1964 | Parker | 74/498 |
| 4,373,599 A | * | 2/1983 | Walter et al. | 180/428 |
| 4,428,450 A | * | 1/1984 | Stenstrom et al. | 180/428 |
| 4,479,400 A | * | 10/1984 | Rieger | 74/422 |
| 4,653,602 A | * | 3/1987 | Anders et al. | 180/444 |
| 4,683,971 A | * | 8/1987 | Westercamp et al. | 180/444 |
| 4,709,591 A | * | 12/1987 | Emori et al. | 74/422 |
| 5,613,572 A | * | 3/1997 | Moedinger | 180/400 |
| 6,098,742 A | * | 8/2000 | Cartwright | 180/435 |
| 6,408,976 B1 | | 6/2002 | Saito et al. | |
| 7,401,677 B2 | * | 7/2008 | Boyle et al. | 180/444 |
| 7,686,125 B2 | * | 3/2010 | Andersson | 180/444 |
| 8,186,325 B2 | * | 5/2012 | Upton et al. | 123/195 E |
| 2001/0054831 A1 | * | 12/2001 | Akasaka | 296/188 |

FOREIGN PATENT DOCUMENTS

| | | | |
|---|---|---|---|
| EP | 890500 A2 | * | 1/1999 |
| JP | 10 338150 | | 12/1998 |
| JP | 11 321694 | | 11/1999 |
| JP | 2000095119 A | * | 4/2000 |
| JP | 2001 151140 | | 6/2001 |
| JP | 2008213597 A | * | 9/2008 |
| JP | 2009040219 A | * | 2/2009 |
| JP | 2010137707 A | * | 6/2010 |
| JP | 2010149597 A | * | 7/2010 |

* cited by examiner

*Primary Examiner* — Tony H. Winner
*Assistant Examiner* — Daniel Yeagley
(74) *Attorney, Agent, or Firm* — Oblon, Spivak, McClelland, Maier & Neustadt, L.L.P.

(57) ABSTRACT

In a center-takeoff-type steering apparatus for a vehicle, radiant heat from a heat source such as an engine is shut off reliably. The bracket is fixed to a central portion of a rack bar for unitary movement, the rack bar moving in the lateral direction in accordance with a steering operation of a steering wheel. Ball joint mechanisms are assembled to the bracket. The ball joint mechanisms rotatably support the inboard ends of the tie rods, swing tie rods in accordance with the movement of the rack bar to thereby steer the left and right front wheels. The heat insulator is integrally formed to have an upper plate portion and a lower plate portion facing each other, and fixed to the bracket so as to cover the ball joint mechanisms.

15 Claims, 12 Drawing Sheets

VEHICULAR STEERING DEVICE

TECHNICAL FIELD

The present invention relates to a center-takeoff-type steering apparatus for a vehicle in which the inboard ends of left and right tie rods are connected to a central portion of a rack bar in order to steer left and right steerable wheels in accordance with a movement of the rack bar in a lateral direction.

BACKGROUND ART

Conventionally, as shown in, for example, Japanese Patent Application Laid-Open (kokai) No. 11-321694, a center-takeoff-type steering apparatus for a vehicle has been known. Such a steering apparatus for a vehicle includes a rack bar whose axis extends in a lateral direction and moves in the lateral direction in accordance with a steering operation of a steering wheel; left and right tie rods which are connected at their outboard ends to left and right steerable wheels and steer the left and right steerable wheels leftward and rightward through swinging motions of the tie rods; and a coupler fixed to a central portion of the rack bar with respect to the axial direction and including a pair of coupling portions to which the inboard ends of the left and right tie rods are rotatably connected, wherein the coupler moves in the lateral direction together with the rack bar so as to swing the left and right tie rods, to thereby steer the left and right steerable wheels leftward and rightward.

DISCLOSURE OF THE INVENTION

In such a case, the coupling portions may be composed of ball joint mechanisms which support the inboard ends of the left and right tie rods in such a manner that the tie rods can rotate in all directions, or cylindrical rotation support mechanisms which support the inboard ends of the left and right tie rods in such a manner that the tie rods can rotate about respective axes perpendicular to the rack bar. In order to allow smooth rotation of the inboard ends of the tie rods, such a mechanism includes a resin member, a rubber member, or the like interposed between the mechanism and the inboard end of the corresponding tie rod, and grease or the like is applied thereto. However, in the center-takeoff-type steering apparatus, since the positions of the inboard ends of the tie rods are high, the coupling portions are apt to receive radiant heat from an engine and its auxiliary equipment, which are located to the lower font in relation to the inboard ends of the tie rods. The radiant heat causes deformation of the resin member and deterioration of the rubber member and the grease or the like, whereby the performance, such as strength, durability, and friction properties, of the steering apparatus deteriorates.

The present invention has been accomplished so as to solve the above-described problem, and its object is to provide a steering apparatus for a vehicle which effectively shuts off radiant heat transfer from an engine and its auxiliary equipment to a coupler which connects the inboard ends of tie rods to a central portion of a rack bar, so as to maintain the performance, such as strength, durability, and friction properties, of the steering apparatus at a satisfactory level.

In order to achieve the above-described object, the present invention provides a steering apparatus for a vehicle characterized by comprising a rack bar which extends such that its axial direction coincides with a lateral direction of the vehicle and which moves in the lateral direction in accordance with a steering operation of a steering wheel; left and right tie rods which are connected at outboard ends thereof to left and right steerable wheels and which steer the left and right steerable wheels leftward and rightward by mean of swing motions of the tie rods; a coupler connected to a central portion of the rack bar with respect to the axial direction and having a pair of coupling portions to which inboard ends of the left and right tie rods are rotatably connected, respectively, the coupler moving in the lateral direction together with the rack bar so as to swing the left and right tie rods to thereby steer the left and right steerable wheels leftward and rightward; and a heat insulator which is integrally formed to have an upper plate portion and a lower plate portion which are connected together at their ends located opposite the rack bar with respect to a front-rear direction and which face each other, the heat insulator being fixed to the coupler so as to cover the coupling portions to thereby shut off radiant heat transfer to the coupling portions from a heat source located forward of the coupler.

According to the above-described feature of the present invention, the heat insulator is provided in the vicinity of the coupling portions to which the inboard ends of the left and right tie rods are rotatably connected. In other words, the heat insulator is provided at a position separated from an engine and its auxiliary components, which serve as a heat source. Therefore, radiant heat transfer from the heat source to the coupling portions can be shut off effectively. For example, as compared with a case where the heat insulator is provided on the side toward the engine and its auxiliary components, the above-mentioned radiant heat can be shut off effectively. Thus, the coupling portions including resin members, rubber members, and grease or the like, which are apt to deform and deteriorate due to heat, can be effectively protected from the heat source, whereby the performance of the coupler can be maintained at a satisfactory level. Further, since the heat insulator is fixed to the coupler, which moves together with the rack bar, even when the rack bar moves in the lateral direction so as to steer the left and right front wheels or the inboard ends of the tie rods move in the vertical direction because of bound and rebound of the left and right front wheels, the heat insulator always covers the coupling portions in the same state. By virtue of this configuration, the heat insulator can be reduced in size, as compared with the case where the heat insulator is attached to the vehicle body or the like, in relation to which the rack bar and the tie rods move.

Another feature of the present invention resides in that the heat insulator is fixed to the coupler by use of a fixing member at a position determined such that the distance between the rack bar and that position is shorter than the distance between the rack bar and the coupling portions. In this case, preferably, the heat insulator is fixed to the coupler at the possibly closest position to the rack bar. By virtue of this configuration, the greater portion of the heat of the heat insulator is transferred to the rack bar, which has a large heat capacity, whereby a temperature rise of the heat insulator itself can be prevented. Further, the amount of heat transferred to the coupling portions can be reduced. As a result, temperature rises of the coupling portions can be effectively suppressed, and the influence of heat on the coupling portions can be mitigated, whereby the performance of the coupling portions can be maintained at a satisfactory level. Further, in this case, preferably, the fixing member is composed of bolts made of metal. This configuration enables heat to more easily transfer to the rack bar via the bolts and the coupler.

Another feature of the present invention resides in that a flat seating surface portion is formed on at least one of the upper and lower surfaces of the coupler at a position located on the side toward the rack bar; a flat surface portion is formed on at least one of the upper plate portion and the lower plate portion of the heat insulator at a central position with respect to the lateral direction; and the heat insulator is fixed to the coupler by use of the fixing member in a state where an inside surface of the flat surface portion of the heat insulator is brought into close contact with the seating surface portion of the coupler. In this case, since the heat insulator is fixed to the coupler at a position located on the side toward the rack bar, the heat insulator is supported by the coupler in a cantilevered fashion. Therefore, an end portion of the heat insulator opposite the rack bar is apt to vibrate in the vertical direction. However, according to the presently discussed feature of the present invention, the inside surface of the flat surface portion of the heat insulator is brought into close contact with the seating surface portion of the coupler. Therefore, the heat insulator is fixed to the coupler in a surface contract state, whereby the above-mentioned vibration is suppressed. In other words, the flat surface portion of the heat insulator in surface contact with the seating surface portion of the coupler functions as a vibration-suppressing rib, whereby vibration of the heat insulator is suppressed satisfactorily.

Another feature of the present invention resides in that the heat insulator is fixed to the coupler at two positions located on the upper and lower sides, respectively, of the coupler. Since the heat insulator is supported by the coupler in a cantilevered fashion as described above, stress stemming from vibration of the heat insulator concentrates at a boundary line of the heat insulator along which the heat insulator comes into contact with the end of the seating surface portion of the coupler opposite the rack bar. However, according to the presently discussed feature, the heat insulator is fixed to the coupler at two positions located on the upper and lower sides, respectively, of the coupler. Therefore, the stress concentrating at the boundary line can be distributed to the upper plate portion and the lower plate portion, whereby the rigidity of the heat insulator can be increased.

Another feature of the present invention resides in that a step portion is provided on at least one of the upper and lower surfaces of the coupler; and a portion of an end surface of at least one of the upper plate portion and the lower plate portion of the heat insulator is brought into contact with an end surface of the step portion provided on the coupler. In this case, the step portion provided on the coupler is formed such that the step portion has a raised portion on the rack bar side, and the rack-bar-side end surface of at least one of the upper plate portion and the lower plate portion of the heat insulator is brought into contact with the end surface of the step portion provided on the coupler.

Further, in the case where the step portion provided on the coupler is formed such that the step portion has a raised portion on the rack bar side, preferably, a groove extending in the front-rear direction is formed in the rack-bar-side raised portion of the step portion. Meanwhile, a projection portion is provided on a rack-bar-side end surface of the heat insulator such that the projection portion projects toward the rack bar from a portion of the end surface. The projection portion of the heat insulator is inserted into the groove of the coupler, a left or right side surface of the projection portion is brought into contact with an inner wall of the groove, and the rack-bar-side end surface of the heat insulator, excluding the portion from which the projection portion projects, is brought into contact with the end surface of the step portion of the coupler. In this case, the projection portion has a rectangular shape, for example.

Preferably, the step portion of the coupler is constituted by a rectangular recess formed in the rack-bar-side raised portion such that the recess extends toward the rack bar side; and a rack-bar-side end portion of at least one of the upper plate portion and the lower plate portion of the heat insulator is formed into a rectangular shape. The rectangular end portion is inserted into the rectangular recess formed in the coupler; a rack-bar-side end surface of the rectangular end portion of the heat insulator is brought into contact with an end surface of the recess of the coupler, the end surface being in parallel to the axial direction of the rack bar; and one of opposite end surfaces of the rectangular end portion of the heat insulator, the end surfaces extending perpendicular to the axial direction of the rack bar, is brought into contact with one of opposite end surfaces of the recess of the coupler, the end surfaces extending perpendicular to the axial direction of the rack bar.

Preferably, the step portion of the coupler is constituted by a groove which is formed at a rack-bar-side position and whose width decreases toward the rack bar; and a projection portion is formed at the rack-bar-side end portion of at least one of the upper plate portion and the lower plate portion of the heat insulator such that the width of the projection portion decreases toward the rack bar. The projection portion is inserted into the groove; and opposite side surfaces of the projection portion are brought into contact with opposite inside surfaces of the groove, respectively.

As described above, a portion of the end surface of at least one of the upper plate portion and the lower plate portion of the heat insulator is brought into contact with the end surface of the step portion provided on the coupler. Therefore, positioning of the heat insulator to the coupler can be performed properly, whereby the accuracy of assembly of the heat insulator to the coupler can be improved. As a result, the problem of interference between the heat insulator and surrounding components, including the tie rods, does not occur even when the heat insulator moves leftward and rightward together with the rack bar or the tie rods swing in accordance with a lateral movement of the rack bar.

Another feature of the present invention resides in that the heat insulator and the coupler are positioned by use of a pin at a position on the rack bar side in relation to the fixing member of the heat insulator. By virtue of this configuration as well, the positioning of the insulator to the coupler can be performed properly, whereby the accuracy of assembly of the heat insulator to the coupler can be improved, and the problem of interference between the heat insulator and surrounding components, including the tie rods, can be solved.

Another feature of the present invention resides in that the area of the upper plate portion of the heat insulator is rendered smaller than that of the lower plate portion thereof. In this case, preferably, the upper plate portion of the heat insulator assumes a shape formed by removing, from a rectangle, laterally opposite portions obliquely frontward, the portions being located on the side toward the rack bar, and the lower plate portion assumes a rectangular shape. In this case, even when the coupling portions move to a leftward position or a rightward position as a result of a leftward or rightward movement of the rack bar, the upper plate portion and the lower plate portion always maintain a state in which radiant heat transfer from the heat source toward the coupling portions is shut off. By virtue of this configuration, hot air within the space between the upper plate portion and the lower plate portion of the heat insulator easily flows upward, so that heat is not accumulated within the heat insulator. Accordingly, temperature rises of the coupling portions can also be suppressed satisfactorily.

Another feature of the present invention resides in that the coupler is formed such that a vertical distance between upper and lower seating surfaces of the coupler to which the heat insulator is attached increases toward the rack bar side; the heat insulator is formed such that a vertical distance between the upper and lower plate portions increases toward the rack bar side; and an angle formed between the upper plate portion and the lower plate portion of the heat insulator is smaller than an angle formed between the upper and lower seating surfaces of the coupler, in a state before the heat insulator is assembled to the coupler. By virtue of this configuration, when the heat insulator is assembled to the coupler, the upper and lower plate portions of the heat insulator generate an interfering force with which the coupler is held therebetween. Also, a releasing force which causes the heat insulator to move away from the coupler is generated. The heat insulator tends to stand still on the coupler at a position at which these two forces are balanced. Therefore, when the heat insulator is fixed to the coupler by making use of the balance between the forces, the heat insulator can be assembled to the coupler at a consistent position. As a result, according to this feature as well, the accuracy of assembly of the heat insulator to the coupler is improved, and the problem of interference between the heat insulator and surrounding components, including the tie rods, can be solved.

Another feature of the present invention resides in that a rack-bar-side end portion of at least one of the upper plate portion and the lower plate portion of the heat insulator is bent toward the coupler; and the bent portion is brought into contact with the rack-bar-side end surface of the coupler. As a result of contact of the bent portion with the end surface of the coupler, the accuracy of assembly of the heat insulator to the coupler is improved. Further, the problem of interference between the heat insulator and surrounding components, including the tie rods, can be solved. In particular, when this configuration is combined with the above-described configuration in which an interfering force and a releasing force are generated upon assembly of the heat insulator to the coupler, the positioning accuracy is improved further.

BEST MODE FOR CARRYING OUT THE INVENTION

Figure 1:
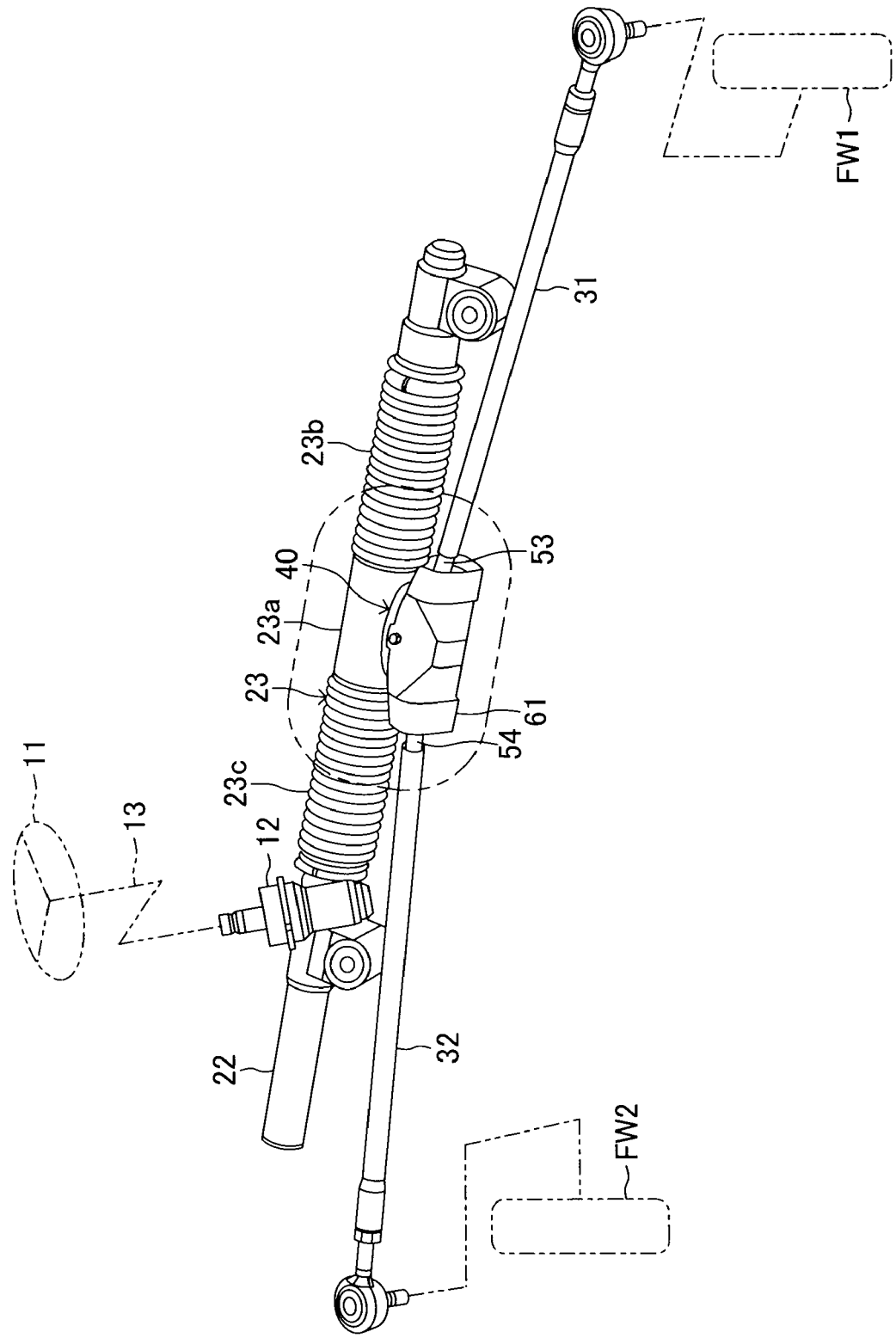
FIG. 1 is an overall outline view of a steering apparatus for a vehicle according to one embodiment of the present invention.
Figure 2:
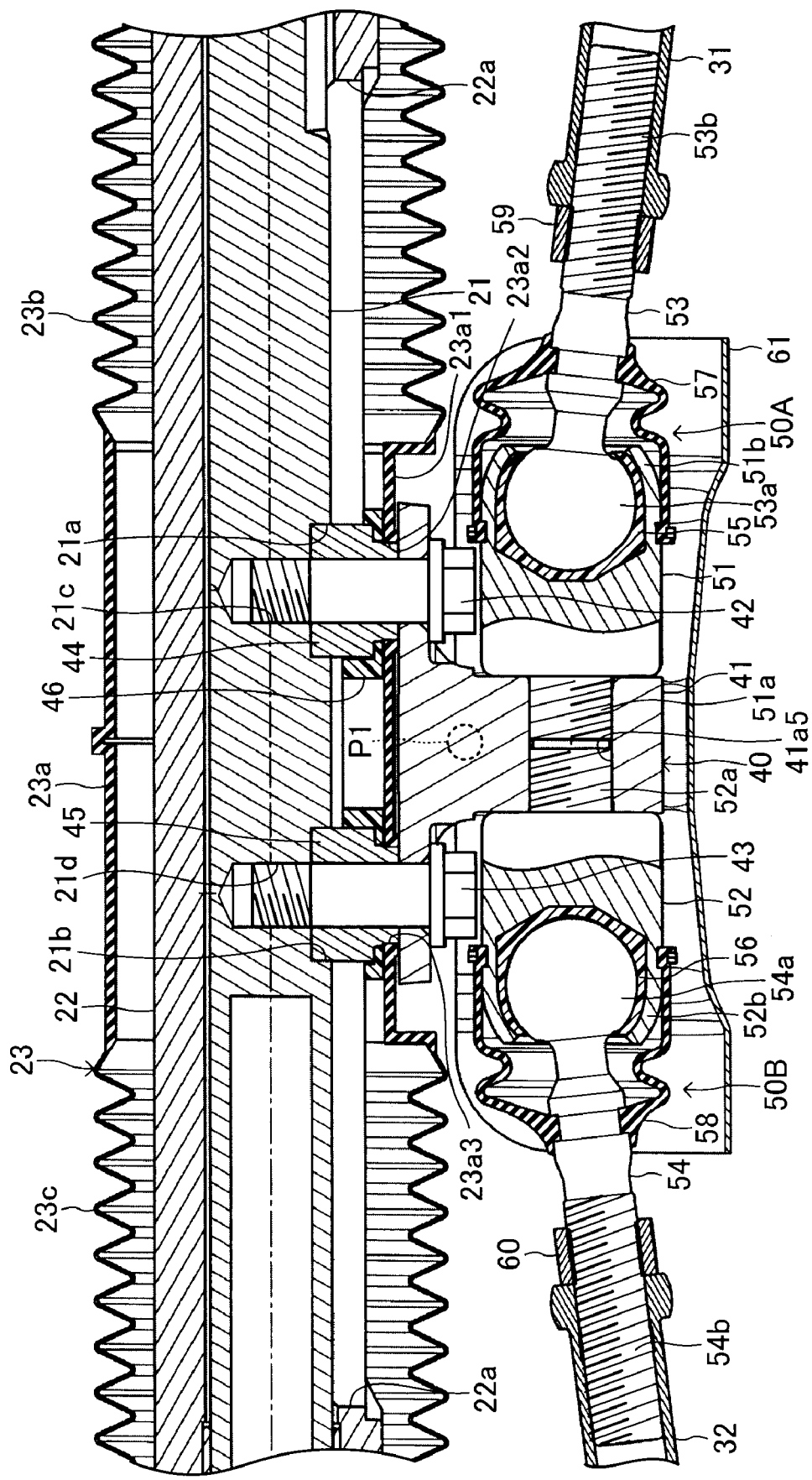
FIG. 2 is an enlarged horizontal sectional view of a portion of FIG. 1 surrounded by a two-dot chain line.

One embodiment of the present invention will be described with reference to the drawings. FIG. 1 is an overall outline view of a steering apparatus for a vehicle according to the embodiment. FIG. 2 is an enlarged horizontal sectional view of a portion of FIG. 1 surrounded by a two-dot chain line. Notably, herein, the front-rear direction refers to the front-rear direction of the vehicle, and the lateral direction refers to the lateral direction of the vehicle.

This steering apparatus for a vehicle includes a steering wheel 11; a rack bar 21; left and right tie rods 31 and 32; a coupler 40; and a heat insulator 61. The steering wheel 11 is operated (or steered) by a driver so as to steer left and right front wheels FW1 and FW2, which are steerable wheels. The rack bar 21 moves in the lateral direction of the vehicle in accordance with the steering operation of the steering wheel 11. In accordance with the lateral movement of the rack bar 21, the tie rods 31 and 32 swing and steer the left and right front wheels FW1 and FW2 leftward and rightward. The coupler 40 couples the rack bar 21 and the tie rods 31 and 32 together, and swigs the tie rods 31 and 32 in accordance with the lateral movement of the rack bar 21. The heat insulator 61 covers the coupler 40 and shuts off radiant heat transfer from a heat source to the coupler 40.

The rack bar 21 is formed from a metallic material into the form of an elongated bar, and has rack teeth at a portion thereof. The rack bar 21 is assembled into a rack bar housing 22 formed from a metallic material into a cylindrical tubular shape, such that the axial direction of the rack bar 21 coincides with that of the rack bar housing 22, and the rack bar 21 can move in the axial direction. Within a gear box 12 attached to the rack bar housing 22, a pinion gear provided at the lower end of a steering shaft 13 is meshed with the rack teeth of the rack bar 21. The steering wheel 11 is attached to the upper end of the steering shaft 13. When the steering wheel 11 is rotated, the steering shaft 13 rotates about its axis, whereby the rack bar 21 moves in the lateral direction. Circular recesses 21a and 21b are formed on the front side of a central portion of the rack bar 21 at positions which become symmetrical with respect to the center position of the vehicle in the lateral direction when the rack bar 21 is located at the neutral position. Further, bottomed threaded holes 21c and 21d having internal threads formed on the inner circumferential surfaces thereof are formed on the front side of the central portion of the rack bar 21 such that the bottomed threaded holes 21c and 21d extend rearward from the centers of the bottom surfaces of the recesses 21a and 21b.

The rack bar housing 22 is fixed to an unillustrated vehicle body such that it extends in the lateral direction of the vehicle. A laterally extending rectangular opening 22a is provided on the front side of a central portion of the rack bar housing 22 so as to allow unitary lateral movement of the rack bar 21 and the coupler 40. The length of the opening 22a in the lateral direction is set slightly greater than the maximum movement amount of the rack bar 21 in the lateral direction.

The rack bar housing 22, excluding left and right end portions thereof, is covered with a dust boot 23. The dust boot 23 is integrally formed of a rubber material, and has a thick-walled central portion 23a and thin-walled bellows portions 23b and 23c formed on opposite sides of the central portion 23a. The central portion 23a, assuming a cylindrical tubular shape, has a setback portion 23a1, which is provided on the front side of the central portion 23a and forms a vertical flat surface. Through holes 23a2 and 23a3 are provided in the setback portion 23a1 at positions which the threaded holes 21c and 21d face when the rack bar 21 is located at the neutral position. Opposite end portions of the dust boot 23 are fixed to the outer circumference of the rack bar housing 22. The central portion 23a of the dust boot 23 is fixed to the rack bar 21 by means of the coupler 40, as will be described in detail later. Accordingly, in accordance with the lateral movement of the rack bar 21, the central portion 23a of the dust boot 23 moves in the lateral direction, while expanding and contracting the bellows portions 23b and 23c.

The outboard ends of the tie rods 31 and 32 are coupled to the left and right front wheels FW1 and FW2 via unillustrated knuckle arms so that the tie rods 31 and 32 can steer the left and right front wheels FW1 and FW2 through swinging motions of the tie rods 31 and 32. The inboard ends of the tie rods 31 and 32 are connected to the coupler 40 so that the tie rods 31 and 32 move in the lateral direction in accordance with the lateral movement of the coupler 40.

Figure 4A:
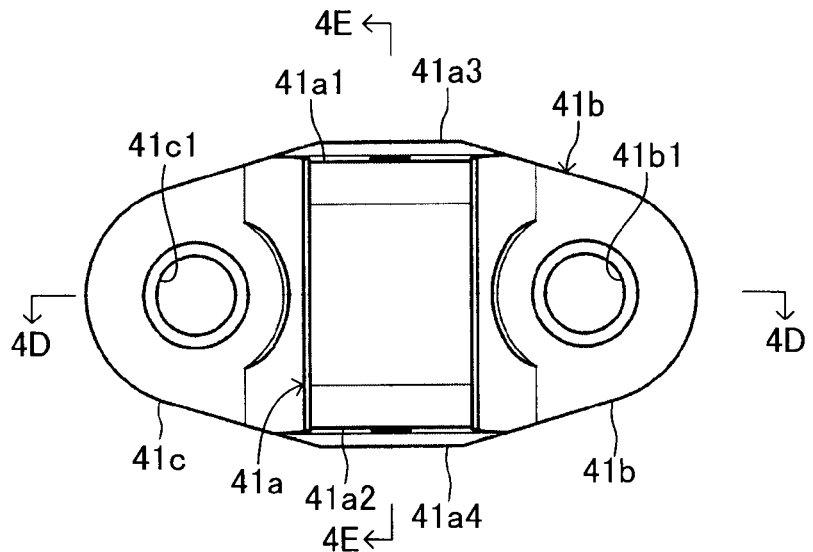
FIG. 4A is a front view of the bracket; that is, a view of the bracket attached to a vehicle as viewed from the front side.
Figure 4B:
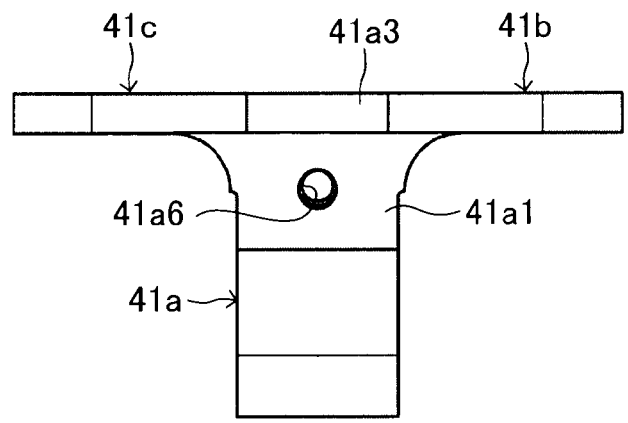
FIG. 4B is a plan view of the bracket.
Figure 4C:
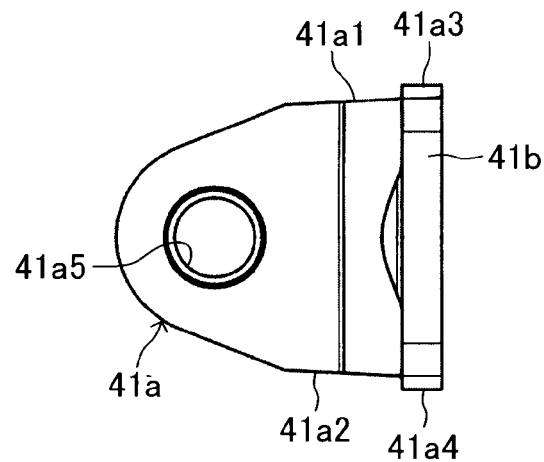
FIG. 4C is a side view of the bracket.
Figure 4D:
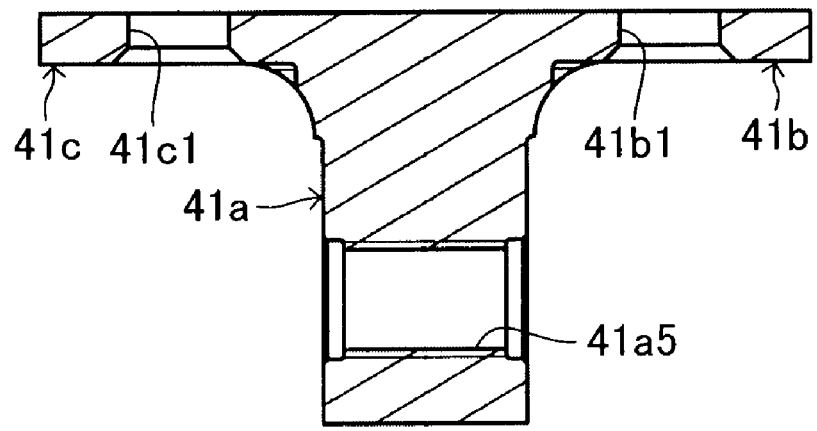
FIG. 4D is a sectional view of the bracket taken along line 4D-4D of FIG. 4A.
Figure 4E:
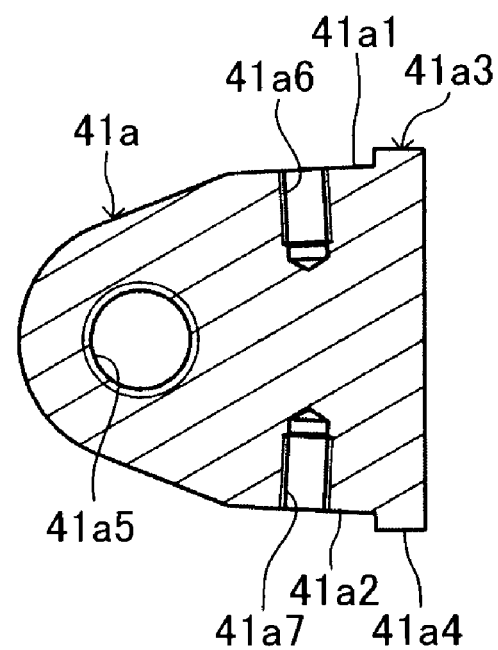
FIG. 4E is a sectional view of the bracket taken along line 4E-4E of FIG. 4A.

The coupler 40 is composed of a bracket 41 and left and right ball joint mechanisms 50A and 50B. As shown in FIGS. 4A to 4E, the bracket 41 is composed of a main body portion 41a and attachment portions 41b and 41c, and is integrally formed of a metallic material such that the bracket 41 assumes a T-like shape as viewed from above. FIG. 4A is a front view of the bracket 41; that is, a view of the bracket 41 attached to a vehicle as viewed from the front side. FIG. 4B is a plan view of the bracket 41, and FIG. 4C is a side view of the bracket 41. FIG. 4D is a sectional view of the bracket 41 taken along line 4D-4D of FIG. 4A, and FIG. 4E is a sectional view of the bracket 41 taken along line 4E-4E of FIG. 4A.

The main body portion 41a is formed such that it has a constant width in the lateral direction, from the front end to a position near the rear end, and at a rear end portion, the width in the lateral direction gradually increases rearward. Further, as viewed from the side, the main body portion 41a has a vertically symmetrical U-like outline (that is, an arcuate outline) at a front portion thereof, and a vertically symmetrical straight outline at a rear end thereof. The upper and lower surfaces of the rear portion form respective flat surfaces, and serve as seating surfaces 41a1 and 41a2 on which the heat insulator 61 seats when it is assembled to the bracket 41. Projection portions 41a3 and 41a4 are provided at the rear end of the main body portion 41a. As viewed from the side, the projection portions 41a3 and 41a4 project upward and downward, respectively, from the seating surfaces 41a1 and 41a2, to thereby form respective steps which extend straight in the lateral direction at the rear ends of the seating surfaces 41a1 and 41a2. The width of these projection portions 41a3 and 41a4 as measured in the front-rear direction is smaller than the length of the seating surfaces 41a1 and 41a2 as measured in the front-rear direction. A threaded hole 41a5 is provided in the front portion of the main body portion 41a. The threaded hole 41a5 passes through the front portion in the lateral direction and has an internal thread formed on the inner circumferential surface thereof. Bottomed threaded holes 41a6 and 41a7 are provided in an intermediate portion of the main body portion 41a. The threaded holes 41a6 and 41a7 extend inward from the seating surfaces 41a1 and 41a2, and have internal threads formed on the inner circumferential surfaces thereof.

The attachment portions 41b and 41c extend rightward and leftward, respectively, from the rear end portion of the main body portion 41a (corresponding to the position of the projection portions 41a3 and 41a4 in the front-rear direction). The width of the attachment portions 41b and 41c as measured in the front-rear direction is equal to the width of the projection portions 41a3 and 41a4 as measured in the front-rear direction. The attachment portions 41b and 41c have a laterally symmetrical U-shaped outline (that is, an arcuate outline) as viewed from the front. Further, holes 41b1 and 41c1 penetrate the attachment portions 41b and 41c, respectively, in the front-rear direction.

The bracket 41 is fixed at the attachment portions 41b and 41c to the rack bar 21 by use of a pair of bolts 42 and 43. The bolts 42 and 43 are passed through the holes 41b1 and 41c1 of the attachment portions 41b and 41c and the through holes 23a2 and 23a3 of the dust boot 23, and are screwed into the threaded holes 21c and 21d of the rack bar 21. In order to firmly fix the coupler 41 to the rack bar 21 and the dust boot 23 at a precise position, collars 44 and 45 formed of metal and a support member 46 formed of resin are assembled to the outer circumferences of the bolts 42 and 43. The collars 44 and 45 are each formed into the form of a stepped cylindrical tube. The bolts 42 and 43 are passed through the collars 44 and 45 in a state where front end portions of the collars 44 and 45 are fitted into the recesses 21a and 21b of the rack bar 21 and rear end portions of the collars 44 and 45 are fitted into the through holes 23a2 and 23a3 of the dust boot 23. The support member 46 is integrally formed into an elliptical shape and has a pair of through holes. The bolts 42 and 43 and the collars 44 and 45 are passed through the through holes of the support member 46. Further, the support member 46 is interposed between the stepped portions of the collars 44 and 45 and the setback portion 23a1 of the dust boot 23, so that the support member 46 and the coupler 40 hold the setback portion 23a1 therebetween.

The ball joint mechanisms 50A and 50B include ball seat members 51 and 52 formed of metal, and ball members 53 and 54 formed of metal. The ball seat members 51 and 52 have external thread portions 51a and 52a at the inboards ends thereof. The ball seat members 51 and 52 are fixed to the bracket 41 by means of screwing the external thread portions 51a and 52a of the ball seat members 51 and 52 into the threaded hole 41a5 of the bracket 41. Ball seat portions 51b and 52b of the ball seat members 51 and 52 rotatably support spherical ball portions 53a and 54a of the ball members 53 and 54 via seats 55 and 56 formed of resin. The ball seat portions 51b and 52b are covered by dust boots 57 and 58 formed of rubber. External thread portions 53b and 54b provided at the outboard ends of the ball members 53 and 54 are screw-engaged with internal threads formed on the inner circumferential surfaces of inboard end portions of the tie rods 31 and 32. The ball members 53 and 54 are firmly fixed to the tie rods 31 and 32 by means of lock nuts 59 and 60. Notably, grease or the like is charged into the ball seat portions 51$b$ and 52$b$ in order to secure smooth rotation of the ball portions 53$a$ and 54$a$. Such ball joint mechanisms 50A and 50B constitute the coupling portions of the present invention, to which the inboard ends of the tie rods 31 and 32 are rotatably connected, respectively.

Figure 5A:
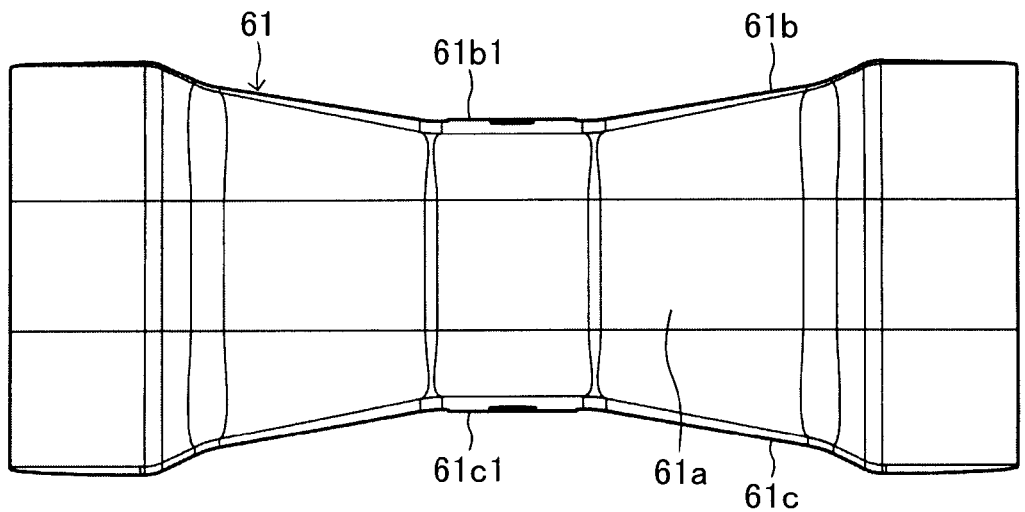
FIG. 5A is a front view of the heat insulator; that is, a view of the heat insulator attached to the vehicle as viewed from the front side.
Figure 5B:
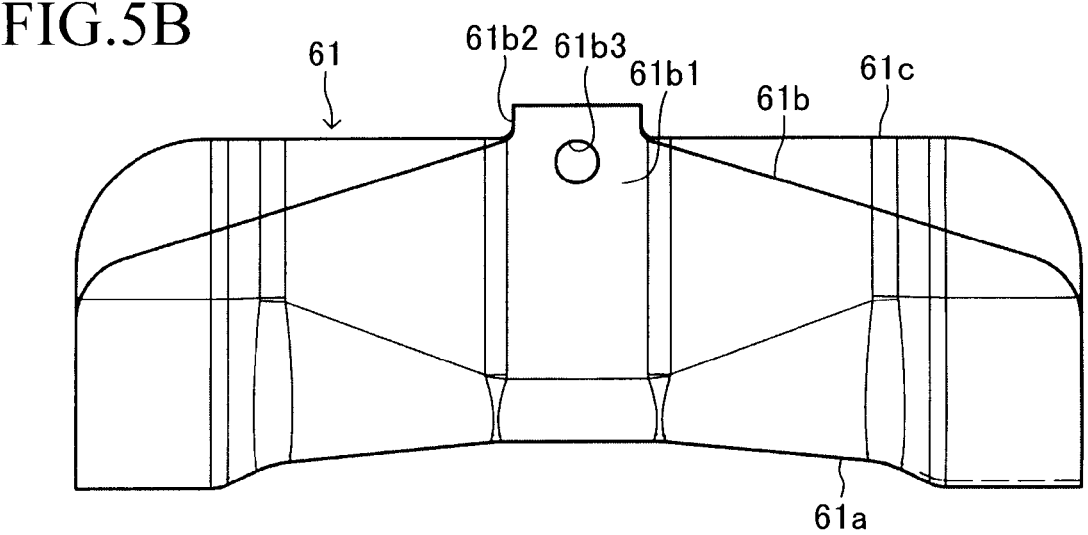
FIG. 5B is a plan view of the heat insulator.
Figure 5C:
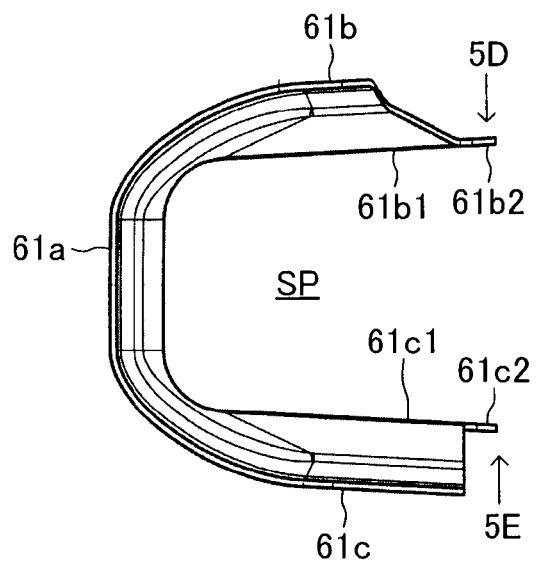
FIG. 5C is a side view of the heat insulator.
Figure 5D:
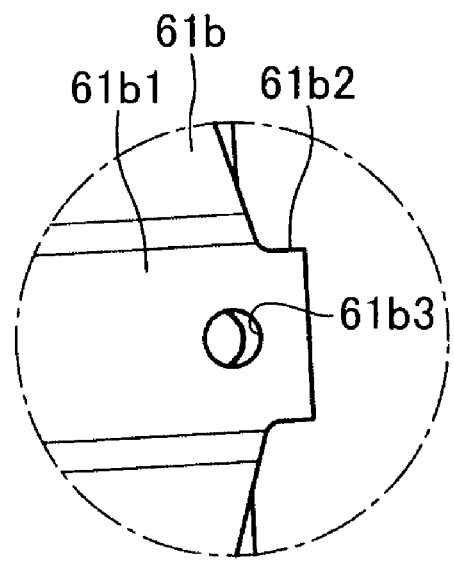
FIG. 5D is a partial enlarged view of a portion of the heat insulator indicated by arrow 5D of FIG. 5C.
Figure 5E:
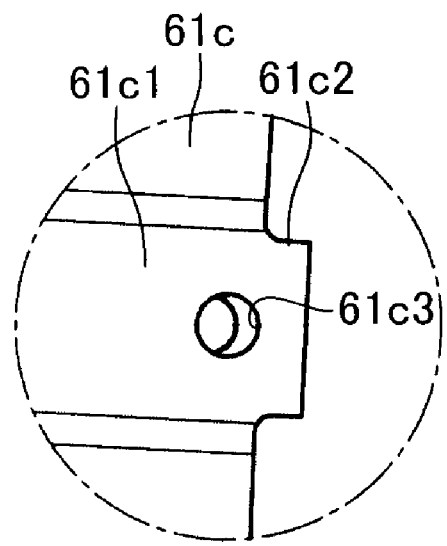
FIG. 5E is a partial enlarged view of a portion of the heat insulator indicated by arrow 5E of FIG. 5C.

The heat insulator 61 covers the coupler 40 from the front side so as to shut off radiant heat transfer to the coupler 40 from an engine and its auxiliary components located at the lower front in relation to the coupler 40, to thereby protect the coupler 40. In particular, the heat insulator 61 shuts off the radiant heat which would otherwise reach the seats 55 and 56 within the coupler 40 and the grease or like charged into the ball seat portions 51$b$ and 52$b$, to thereby protect the ball joint mechanisms 50A and 50B. This heat insulator 61 is shown in FIGS. 5A to 5E. FIG. 5A is a front view of the heat insulator 61; that is, a view of the heat insulator 61 attached to the vehicle as viewed from the front side. FIG. 5B is a plan view of the heat insulator 61, and FIG. 5C is a side view of the heat insulator 61. FIG. 5D is a partial enlarged view of a portion of the heat insulator 61 indicated by arrow 5D of FIG. 5C. FIG. 5E is a partial enlarged view of a portion of the heat insulator 61 indicated by arrow 5E of FIG. 5C.

The heat insulator 61 is formed from a metal plate (e.g., a metal plate made of iron) through bending work performed thereon. The heat insulator 61 has an upper plate portion 61$b$ and a lower plate portion 61$c$ connected together by a connecting portion 61$a$, which is located on the front side when the heat insulator 61 is attached to the coupler 40. The upper plate portion 61$b$ and the lower plate portion 61$c$ face each other in the vertical direction and form, together with the connecting portion 61$a$, a space SP which has a U-shaped vertical cross section and is open rearward. Notably, this space SP is open at the left and right sides as well. The lower plate portion 61$c$ is formed to assume a rectangular shape, and is cut symmetrically with respect to the lateral direction at the left and right rear end portions such that small arcuate corners are formed. The upper plate portion 61$b$ is formed to assume a rectangular shape identical with that of the lower plate portion 61$c$, but is cut relatively greatly. That is, the upper plate portion 61$b$ is cut obliquely frontward from a central portion thereof symmetrically with respect to the lateral direction. The area of the upper plate portion 61$b$ is set smaller than that of the lower plate portion 61$c$. In other word, the area of the upper plate portion 61$b$ which covers the space SP is smaller than that of the lower plate portion 61$c$ which covers the space SP, by an amount corresponding to the areas of the removed portions of the upper plate portion 61$b$. Further, the connecting portion 61$a$, the upper plate portion 61$b$, and the lower plate portion 61$c$ are formed in such a manner that their central portions with respect to the lateral direction are set back from their remaining outboard portions.

Flat surface portions 61$b$1 and 61$c$1 having a predetermined width are formed at the center positions of the upper plate portion 61$b$ and the lower plate portion 61$c$ such that the flat surface portions 61$b$1 and 61$c$1 extend rearward from positions near the respective front ends. Rear end portions of the flat surface portions 61$b$1 and 61$c$1 project from the rear end surfaces of the upper plate portion 61$b$ and the lower plate portion 61$c$, the rear end surfaces being located on the left and right sides of the rear end portions, to thereby form rectangular projection portions 61$b$2 and 61$c$2. Circular through holes 61$b$3 and 61$c$3 are formed at positions located frontward of the projection portions 61$b$2 and 61$c$2 and located at the central position in the lateral direction. The through holes 61$b$3 and 61$c$3 have a diameter equal to that of the threaded holes 41$a$6 and 41$a$7 of the bracket 41. The distances between the rearmost positions of the entrances of the through holes 61$b$3 and 61$c$3 and the front ends of the projection portions 61$b$2 and 61$c$2 are equal to the distances between the rearmost positions of the entrances of the threaded holes 41$a$6 and 41$a$7 of the bracket 41 and the steps formed by the projection portions 41$a$3 and 41$a$4 provided on the seating surfaces 41$a$1 and 41$a$2. This dimensional relation is employed in order that, at the time of assembly of the heat insulator 61 to the bracket 41, the rear end surfaces of the projection portions 61$b$2 and 61$c$2 of the heat insulator 61 can be brought into engagement with the step surfaces formed by the projection portions 41$a$3, 41$a$4 of the bracket 41 to thereby position the heat insulator 61. Desirably, the end surfaces of the projection portions 61$b$2 and 61$c$2 of the heat insulator 61 are accurately machined through press stamping. Further, desirably, the step surfaces of the projection portions 41$a$3 and 41$a$4 of the bracket 41 are formed accurately through machining such as cutting.

Figure 3A:
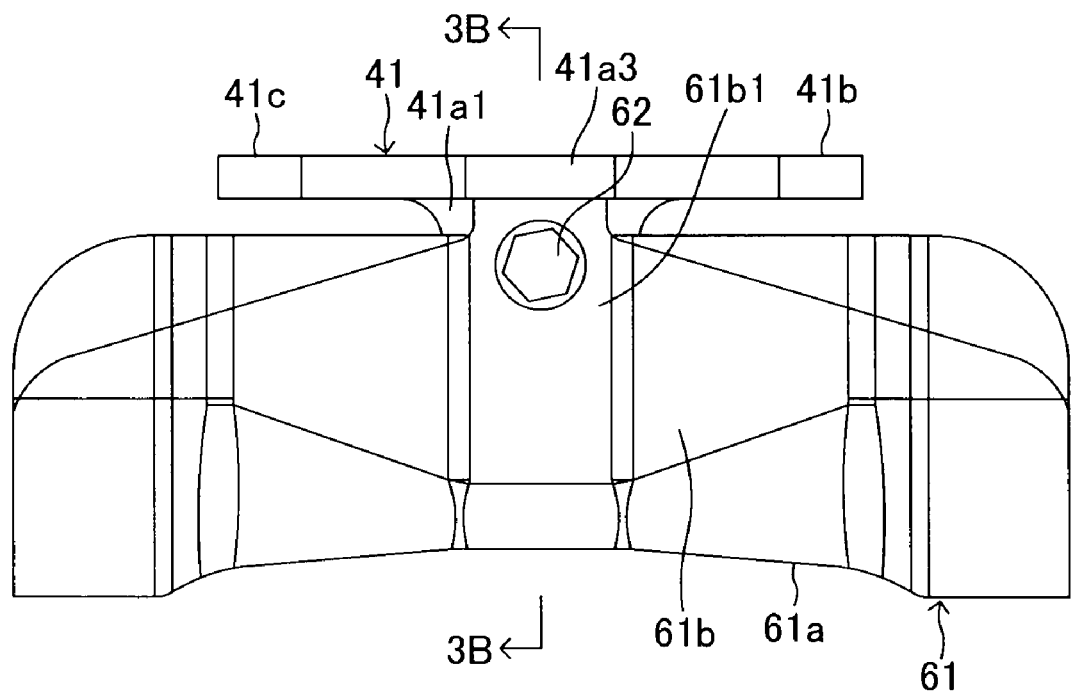
FIG. 3A is a plan view showing a state where a heat insulator is assembled to a bracket.
Figure 3B:
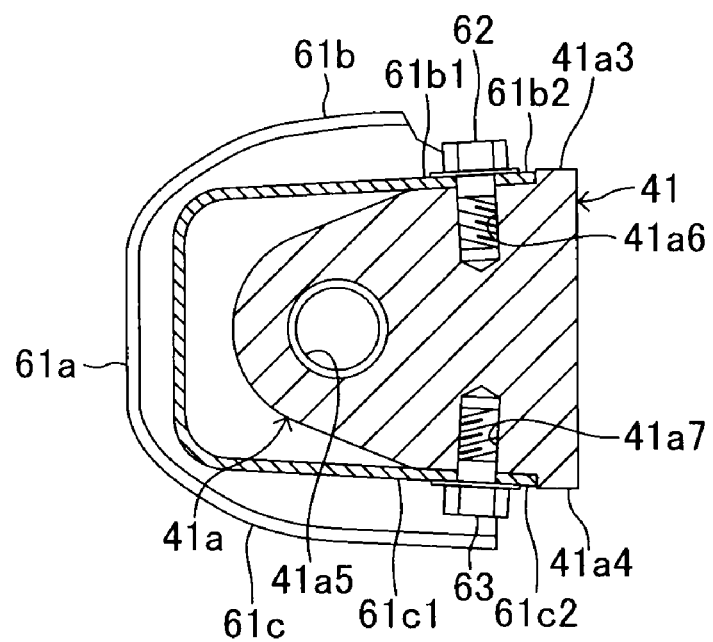
FIG. 3B is a sectional view taken along line 3B-3B of FIG. 3A.

As shown in FIGS. 3A and 3B, the heat insulator 61 configured as described above is fixed to the main body portion 41$a$ of the bracket 41. FIG. 3A is a plan view of the bracket 41 and the heat insulator 61 taken out from FIGS. 1 and 2, the view showing the state where the heat insulator 61 is assembled to the bracket 41. FIG. 3B is a sectional view taken along line 3B-3B of FIG. 3A.

The heat insulator 61 is disposed in such a manner that the lower surface of the flat surface portion 61$b$1 of the upper plate portion 61$b$ is brought into close contact with the seating surface 41$a$1 of the bracket 41, and the upper surface of the flat surface portion 61$c$1 of the lower plate portion 61$c$ is brought into close contact with the seating surface 41$a$2 of the bracket 41. Subsequently, the rear end surface of the projection portion 61$b$2 of the upper plate portion 61$b$ of the heat insulator 61 is brought into contact with the step surface of the projection portion 41$a$3 of the bracket 41, and the rear end surface of the projection portion 61$c$2 of the lower plate portion 61$c$ of the heat insulator 61 is brought into contact with the step surface of the projection portion 41$a$4 of the bracket 41. Then, the bolts 62 and 63 are inserted into the threaded holes 41$a$6 and 41$a$7 of the bracket 41 via the through holes 61$b$3 and 61$c$3 of the heat insulator 61, and are screw-engaged therewith. Thus, the heat insulator 61 is fixed to the bracket 41.

Operation of the embodiment having the above-described structure will now be described. When a driver rotates the steering wheel 11 clockwise or counterclockwise, rotation of the steering wheel 11 is transferred to the rack bar 21 via the steering shaft 13, whereby the rack bar 21 moves in the lateral direction. As a result of this lateral movement of the rack bar 21, the bracket 41 and the ball seat members 51 and 52 move in the lateral direction together with the rack bar 21. As a result of the lateral movements of the ball seat members 51 and 52, the tie rods 31 and 32 swing together with the ball members 53 and 54, accompanied by rotation of the ball portions 53$a$ and 54$a$ of the ball members 53 and 54, whereby the left and right front wheels FW1 and FW2 are steered. Accordingly, the left and right front wheels FW1 and FW2 are steered in response to the rotating operation of the steering wheel 11.

Further, the heat insulator 61 shuts off the radiant heat transfer from the engine and its auxiliary components toward the coupler 40; particularly, the seats 55 and 56, the ball seat portions 51$b$ and 52$b$, and the ball portions 53$a$ and 54$a$ of the ball joint mechanisms 50A and 50B. Accordingly, since the temperatures of the seats 55 and 56 and the grease or the like within the ball seat portions 51b and 52b do not increase to high temperature, the seats 55 and 56 and the grease or the like become less likely to deform and deteriorate due to heat, whereby satisfactory operation of the ball joint mechanisms 50A and 50B is maintained.

Figure 6:
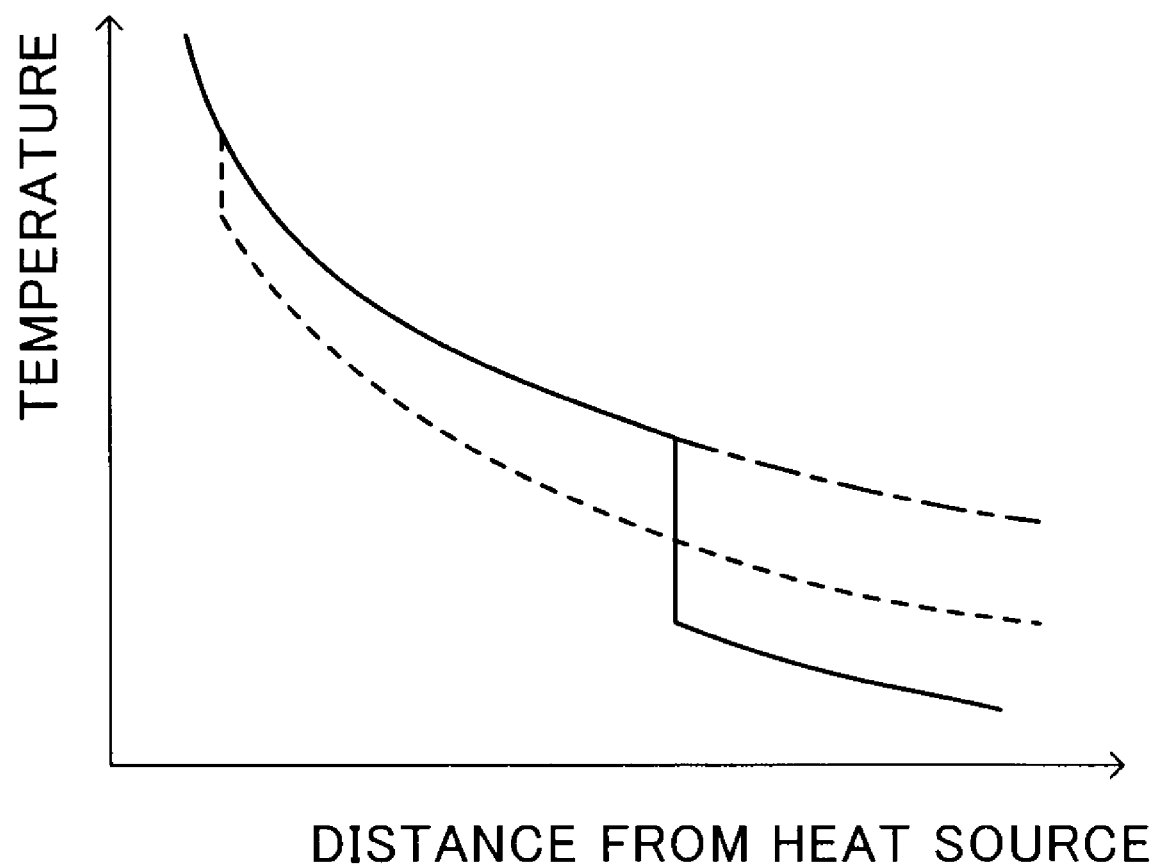
FIG. 6 is a graph showing change in temperature with distance from a heat source and used to describe the action of the heat insulator.

Next, specific effects of the embodiment, which is configured and operates as described above, will be described. In the above-described embodiment, the heat insulator 61 is provided in the vicinity of an object; that is, the ball joint mechanisms 50A and 50B, which must be protected from a heat source. In other words, the heat insulator 61 is not provided near the heat source (the engine and its auxiliary components), but is provided at a position separated from the heat source. By virtue of this, radiant heat transfer from the heat source to the seats 55 and 56, the ball seat portions 51b and 52b, and the ball portions 53a and 54a of the ball joint mechanisms 50A and 50B can be effectively shut off. This effect can also be understood from the graph of FIG. 6, which shows the relation between the distance from a heat source and the temperature at a position separated from the heat source by that distance. In the graph of FIG. 6, a single-dot chain line shows the relation between the distance and the temperature for the case where the heat insulator 61 is not provided, and a broken line shows the relation between the distance and the temperature for the case where the heat insulator 61 is disposed near the heat source. A solid line shows the relation between the distance and the temperature for the case where the heat insulator 61 is disposed apart from the heat source as in the present embodiment. In this case, a temperature rise of a to-be-protected object due to the heat source in particular can be suppressed without fail. As a result, there can be maintained satisfactory operations of the seats 55 and 56, the ball seat portions 51b, 52b, and the ball portions 53a and 54a of the ball joint mechanisms 50A and 50B, which are apt to receive the influence of heat.

Further, the heat insulator 61 is fixed to the coupler 40, which moves together with the rack bar 21. Accordingly, even when the rack bar 21 moves in the lateral direction so as to steer the left and right front wheels FW1 and FW2 or the inboard ends of tie rods 31 and 32 move in the vertical direction because of bound and rebound of the left and right front wheels FW1 and FW2, the heat insulator 61 always covers the seats 55 and 56, the ball seat portions 51b and 52b, and the ball portions 53a and 54a of the ball joint mechanisms 50A and 50B substantially in the same state. By virtue of this configuration, the heat insulator 61 can be reduced in size, as compared with the case where the heat insulator 61 is attached to the vehicle body or the like, in relation to which the rack bar 21 and the tie rods 31 and 32 move.

Further, in the above-described embodiment, the heat insulator 61 is fixed to the bracket 41 by use of the bolts 62 and 63 at a position between the ball seat members 51 and 52 and the rack bar 21 with respect to the front-rear direction (a position P1 indicated by a broken line in FIG. 2). That is, the heat insulator 61 is fixed to the bracket 41 at a position determined such that the distance between the rack bar 21 and that position is shorter than the distances between the rack bar 21 and the seats 55 and 56, the ball seat portions 51b and 52b, and the ball portions 53a and 54a of the ball joint mechanisms 50A and 50B. Accordingly, the greater portion of the heat of the heat insulator 61 is transferred to the rack bar 21, which has a large heat capacity, via the bolts 62 and 63 and the bracket 41, whereby a temperature rise of the heat insulator 61 itself can be prevented. Further, the amount of heat transferred to the seats 55 and 56, the ball seat portions 51b and 52b, and the ball portions 53a and 54a can be reduced. This can be easily understood by considering the case where the heat insulator 61 is fixed to the bracket 41 at a position forward of the ball seat members 51 and 52. As a result, temperature rises of the seats 55 and 56, the ball seat portions 51b and 52b, and the ball portions 53a and 54a can be effectively suppressed, and the influence of heat on the ball joint mechanisms 50A and 50B can be mitigated, whereby the performance of the ball joint mechanisms 50A and 50B can be maintained at a satisfactory level.

Figure 7:
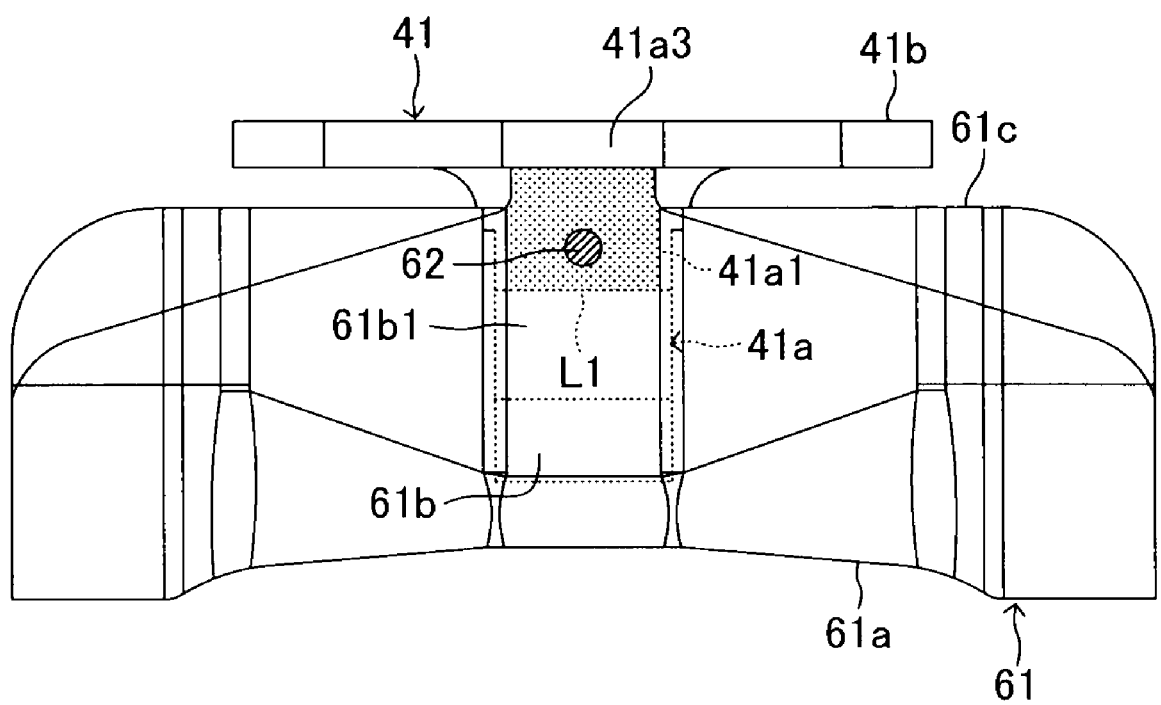
FIG. 7 is an explanatory view showing a state where the heat insulator is assembled to the bracket.

Further, in the above-described embodiment, the flat seating surfaces 41a1 and 41a2 are formed on the upper and lower surfaces, respectively, of the bracket 41 on the side toward the rack bar 21, and the flat surface portions 61b1 and 61c1 are formed on the upper plate portion 61b and the lower plate portion 61c, respectively, of the heat insulator 61 at the central position with respect to the lateral direction. Then, as shown in FIG. 7, the inside surfaces of the flat surface portions 61b1 and 61c1 of the heat insulator 61 are brought into close contact with the seating surfaces 41a1 and 41a2, respectively, of the bracket 41, and, by use of the bolts 62 and 63, the heat insulator 61 is fixed to the bracket 41 at two points located on the upper and lower sides, respectively, of the bracket 41. In such a case, since the heat insulator 61 is fixed to the bracket 41 at a position on the side toward the rack bar 21, the heat insulator 61 is supported by the bracket 41 in a cantilevered fashion, so that an end portion of the heat insulator 61 opposite the rack bar 21 is apt to vibrate in the vertical direction. However, since, as described above, the inside surfaces of the flat surface portions 61b1 and 61c1 of the heat insulator 61 are brought into close contact with the seating surfaces 41a1 and 41a2 of the bracket 41, the heat insulator 61 is fixed to the bracket 41 in a surface contact state; i.e., in a hatched area shown in FIG. 7, whereby the above-mentioned vibration is suppressed. In other words, the flat surface portions 61b1 and 61c1 of the heat insulator 61, which come into surface contact with the seating surfaces 41a1 and 41a2 of the bracket 41, each function as a vibration-suppressing rib, whereby vibration of the heat insulator 61 is prevented satisfactorily.

Further, as described above, the heat insulator 61 is supported by the bracket 41 in a cantilevered fashion. Therefore, stress stemming from vibration of the heat insulator 61 concentrates at a boundary line L1 of the heat insulator 61 along which the heat insulator 61 comes into contact with the ends of the seating surfaces 41a1 and 41a2 of the bracket 41 opposite the rack bar 21. However, since the heat insulator 61 is fixed to the bracket 41 at two points on the upper and lower sides thereof as described above, the stress concentrating at the boundary line L1 can be distributed to the upper plate portion 61b and the lower plate portion 61c, whereby the rigidity of the heat insulator 61 can be increased. However, in the case where fixing of the heat insulator 61 to the bracket 41 on one side (upper side or lower side) can sufficiently suppress the vertical vibration of the end portion of the heat insulator 61 opposite the rack bar 21 and can increase the rigidity of the heat insulator 61, the heat insulator 61 may be fixed to the bracket 41 only on the upper side or lower side thereof by use of only one of the bolts 62 and 63 in a state where the inside surface of only one of the flat surface portions 61b1 and 61c1 of the heat insulator 61 is in close contact with the corresponding seating surface 41a1 or 41a2 of the bracket 41.

Further, in the above-described embodiment, the projection portions 41a3 and 41a4, which project upward and downward, respectively, are provided at the rack bar 21 side end portions of the upper and lower seating surfaces 41a1 and 41a2 of the bracket 41, whereby step portions extending in parallel to the axial direction of the rack bar 21 are provided on the seating surfaces 41a1 and 41a2. Then, as shown in FIGS. 3A and 3B, the rack bar 21 side end surfaces of the flat surface portions 61b1 and 61c1 of the heat insulator 61 are brought into contact with the end surfaces of the step portions. By virtue of this configuration, positioning of the heat insulator 61 to the bracket 41 for assembly can be performed properly, whereby the accuracy of assembly of the heat insulator 61 to the bracket 41 can be improved. As a result, even when the heat insulator 61 moves leftward and rightward together with the rack bar 21 and the tie rods 31 and 32 swing as a result of lateral movement of the rack bar 21, the heat insulator 61 does not interfere with surrounding components, including the tie rods 31 and 32.

Further, in the above-described embodiment, the area of the upper plate portion 61b of the heat insulator 61 is rendered smaller than that of the lower plate portion 61c thereof. Specifically, the upper plate portion 61b of the heat insulator 61 assumes a shape formed by removing, from a rectangle, laterally opposite portions obliquely frontward, the portions being located on the side toward the rack bar 21; and the lower plate portion 61c assumes a rectangular shape. However, laterally opposite ends of the lower plate portion 61c located on the side toward the rack bar 21 are slightly cut to have rounded corners. Further, even when the bracket 41 moves leftward or rightward as a result of a leftward or rightward movement of the rack bar 21, the upper plate portion 61b and the lower plate portion 61c always shut off radiant heat transfer from the heat source toward the ball seat portions 51b and 52b, the ball portions 53a and 54a, and the seats 55 and 56 of the ball joint mechanisms 50A and 50B. By virtue of this configuration, hot air within the space SP between the upper plate portion 61b and the lower plate portion 61c of the heat insulator 61 easily flows upward, so that heat is not accumulated within the heat insulator 61. Accordingly, a temperature rise of the bracket 41 can also prevented satisfactorily.

The present invention is not limited to the above-described embodiment, and various modifications can be employed within the scope of the present invention.

Figure 8A:
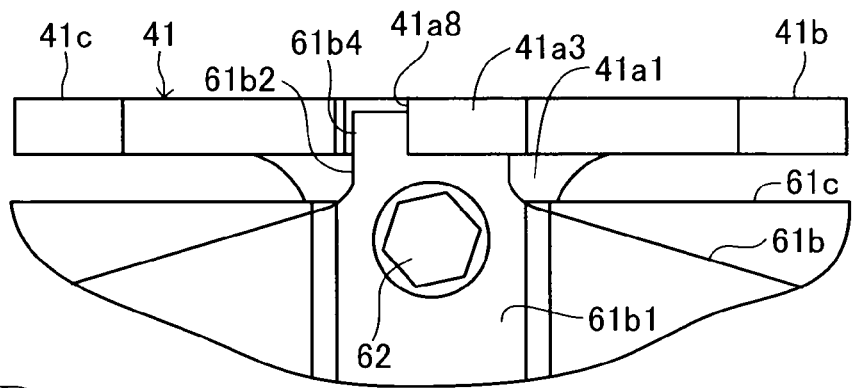
FIG. 8A is a partial plan view showing a state where the heat insulator is assembled to the bracket according to a modification.

In the above-described embodiment, the front end surface of the projection portion 41a3 provided on the bracket 41 is merely flat. However, alternatively, as shown in FIG. 8A, a rectangular groove 41a8 may be formed in the projection portion 41a3 such that the rectangular groove 41a8 has a width smaller than that of the projection portion 41a3 as measured in the lateral direction and extends rearward from the front end surface of the projection portion 41a3. The left and right side surfaces of the groove 41a8 are made flat, and the bottom surface of the groove 41a8 is flush with the seating surface 41a1. Meanwhile, a rectangular second projection portion 61b4 is provided on the rear end surface of the projection portion 61b2 of the heat insulator 61 such that the second projection portion 61b4 has a width smaller than that of the projection portion 61b2 as measured in the lateral direction and projects rearward. The width of the second projection portion 61b4 as measured in the lateral direction is smaller than that of the groove 41a8 provided in the bracket 41, and the bottom surface of the second projection portion 61b4 is flush with the bottom surface of the projection portion 61b2. When the heat insulator 61 is assembled to the bracket 41, the second projection portion 61b4 is inserted into the groove 41a8 of the bracket 41 from the front side, and one of the left and right side surfaces of the second projection portion 61b4 is brought into contact with one of the left and right inside surfaces of the groove 41a8. Further, the rear end surface of the projection portion 61b2 of the heat insulator 61 where the second projection portion 61b4 does not exist is brought into contact with the front end surface of the projection portion 41a3 of the bracket 41.

Although not illustrated in the drawing, a groove similar to the groove 41a8 is formed in the projection portion 41a4 on the lower surface side of the bracket 41, and a second projection portion similar to the second projection portion 61b4 is formed on the projection portion 61c2 of the lower plate portion 61c of the heat insulator 61. In the above-described modification, the groove 41a8 extends from the front end surface to the rear end surface of the projection portion 41a3. However, the groove 41a8 is not necessarily required to extend from the front end surface to the rear end surface of the projection portion 41a3, and may be formed to extend to an intermediate position of the projection portion 41a3 with respect to the front-rear direction. According to this modification, positioning against rotation of the heat insulator 61 can be performed properly.

Figure 8B:
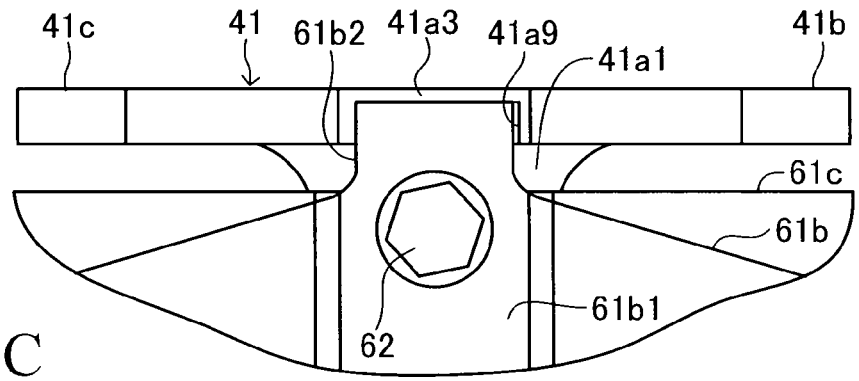
FIG. 8B is a partial plan view showing a state where the heat insulator is assembled to the bracket according to another modification.

Further, as shown in FIG. 8B, a rectangular recess 41a9 may be formed in the projection portion 41a3 of the bracket 41 such that the recess 41a9 extends rearward from the front end surface thereof. The left and right inside surfaces and rear inside surface of the recess 41a9 are made flat, and the bottom surface of the groove 41a9 is flush with the seating surface 41a1. Meanwhile, the length of the projection portion 61b2 of the heat insulator 61 as measured in the front-rear direction is slightly longer than that in the above-described embodiment, and the length of the projection portion 61b2 as measured in the lateral direction is slightly shorter than that of the recess 41a9. Further, the left and right side surfaces of the projection portion 61b2 are made flat as in the case of the rear end surface thereof. When the heat insulator 61 is assembled to the bracket 41, the projection portion 61b2 is inserted into the recess 41a9 of the bracket 41 from the front side until the rear end surface of the projection portion 61b2 comes into contact with the rear surface of the recess 41a9 of the bracket 41, and one of the left and right side surfaces of the projection portion 61b2 is brought into contact with one of the left and right inside surfaces of the recess 41a9.

Although not illustrated in the drawing, a recess similar to the recess 41a9 is formed in the projection portion 41a4 on the lower surface side of the bracket 41, and the projection portion 61c2 of the lower plate portion 61c of the heat insulator 61 is configured in the same manner as the projection portion 61b2 according to the present modification. According to this modification as well, positioning against rotation of the heat insulator 61 can be performed properly.

Figure 8C:
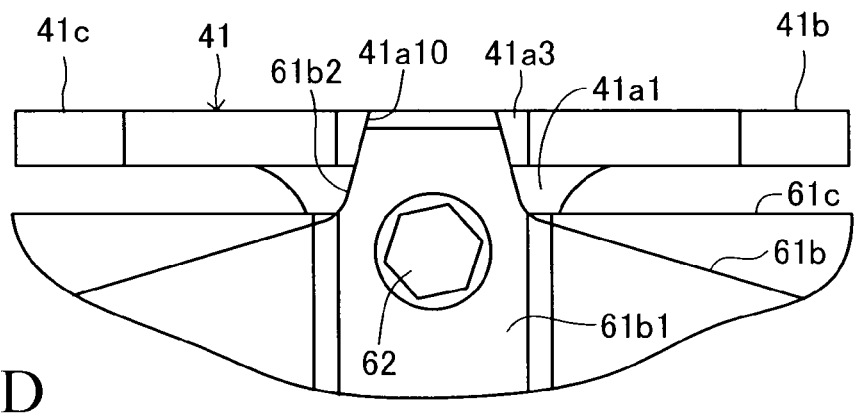
FIG. 8C is a partial plan view showing a state where the heat insulator is assembled to the bracket according to another modification.

Further, as shown in FIG. 8C, a tapered groove 41a10; i.e., a groove 41a10 whose width decreases rearward from the front end surface of the projection portion 41a3 may be formed in the projection portion 41a3 of the bracket 41. The left and right inside surfaces of the groove 41a10 are made flat, and the bottom surface of the groove 41a10 is flush with the seating surface 41a1. Meanwhile, the projection portion 61b2 of the heat insulator 61 is tapered at the same inclination angle as the groove 41a10 so that its width decreases rearward. The left and right side surfaces of the projection portion 61b2 are also made flat. The length of the rear end of the projection portion 61b2 as measured in the lateral direction is shorter than that of the front end of the groove 41a10 and longer than that of the rear end of the groove 41a10. The length of the front end of the projection portion 61b2 as measured in the lateral direction is longer than that of the front end of the groove 41a10. When the heat insulator 61 is assembled to the bracket 41, the projection portion 61b2 is inserted into the groove 41a10 of the bracket 41 from the front side, and the left and right side surfaces of the projection portion 61b2 are brought into contact with the left and right inside surfaces of the groove 41a10 of the bracket 41.

Although not illustrated in the drawing, a groove similar to the groove 41a10 is formed in the projection portion 41a4 on the lower surface side of the bracket 41, and the projection portion 61c2 of the lower plate portion 61c of the heat insulator 61 is configured in the same manner as the projection portion 61b2 according to the present modification. In the above-described modification, the groove 41a10 extends from the front end surface to the rear end surface of the projection portion 41a3. However, the groove 41a10 is not necessarily required to extend from the front end surface to the rear end surface of the projection portion 41a3, and may be formed to extend to an intermediate position of the projection portion 41a3 with respect to the front-rear direction. According to this modification, positioning against rotation of the heat insulator 61 can also be performed properly.

Figure 8D:
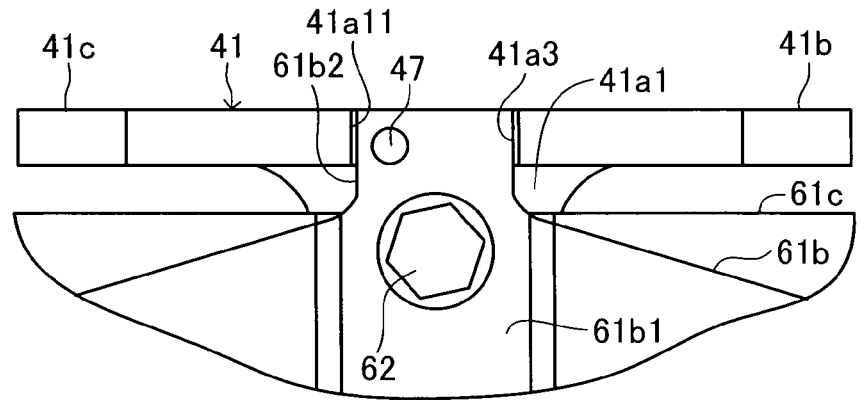
FIG. 8D is a partial plan view showing a state where the heat insulator is assembled to the bracket according to another modification.

Further, as shown in FIG. 8D, a groove 41a11 may be formed in the projection portion 41a3 of the bracket 41 such that the groove 41a11 extend rearward along the front-rear direction from the rear end portion of the projection portion 41a3. The bottom surface of this groove 41a11 is flush with the seating surface 41a1. Meanwhile, the length of the projection portion 61b2 of the heat insulator 61 as measured in the front-rear direction is slightly longer than that in the above-described embodiment, and the length of the projection portion 61b2 as measured in the lateral direction is slightly shorter than that of the groove 41a11. Further, pin holes are formed in the projection portion 61b2 and the bottom wall of the groove 41a11 at the same position as viewed from above. When the heat insulator 61 is assembled to the bracket 41, the projection portion 61b2 is inserted into the groove 41a11 of the bracket 41 from the front side, and a pin 47 is press-fitted into the pin holes provided in the projection portion 61b2 and the bottom wall of the groove 41a11, whereby the position of the heat insulator 61 in relation to the bracket 41 is determined.

Although not illustrated in the drawing, a groove similar to the groove 41a11 and a pin hole are also provided in the projection portion 41a4 on the lower surface side of the bracket 41, and the projection portion 61c2 of the lower plate portion 61c of the heat insulator 61 is configured in the same manner as the projection portion 61b2 according to the present modification. According to this modification as well, positioning of the heat insulator 61 can be performed properly.

In the above-described embodiments of FIGS. 8A to 8D, the grooves 41a8, 41a10 and the recesses 41a9 formed in the projection portions 41a3 and 41a4 of the bracket 41, and the second projection portions 61b4, the projection portions 61b2, and the pins 47 provided on the heat insulator 61 are each located at the same lateral position on both the upper side and the lower side of the bracket 41. However, alternatively, the grooves 41a8, 41a10 and the recesses 41a9 formed in the projection portions 41a3 and 41a4 of the bracket 41, and the second projection portions 61b4, the projection portions 61b2, and the pins 47 provided on the heat insulator 61 may be provided at respective lateral positions which differ between the upper side and the lower side of the bracket 41. This configuration prevents the heat insulator 61 from being assembled to the bracket 41 upside down.

Figure 9A:
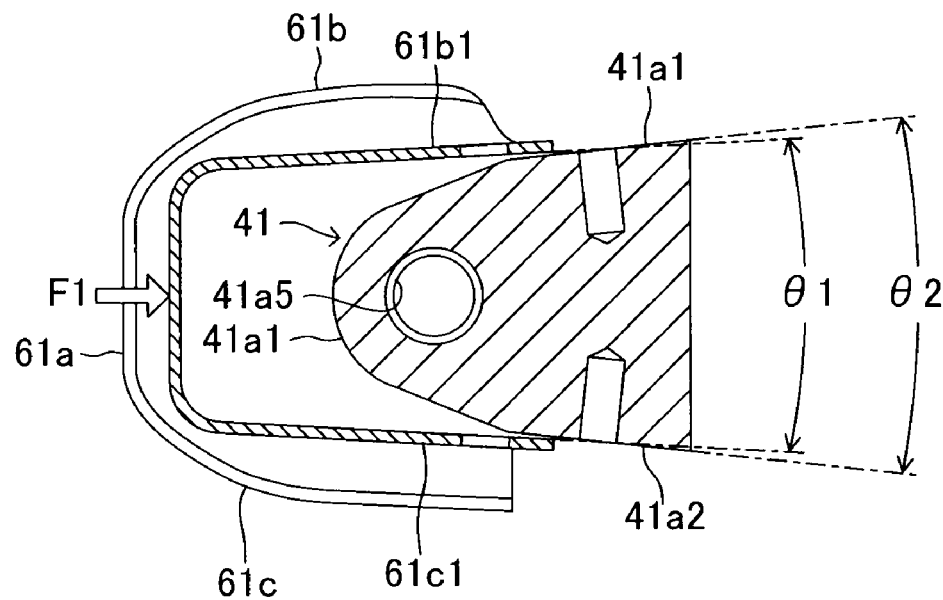
FIG. 9A is a vertical sectional view relating to another modification and showing a state before the heat insulator is assembled to the bracket.
Figure 9B:
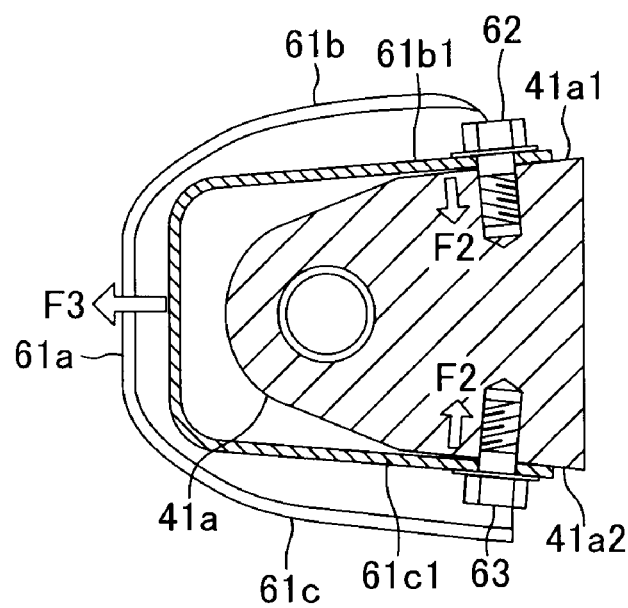
FIG. 9B is a vertical sectional view relating to the modification of FIG. 9A and showing a state after the heat insulator has been assembled to the bracket.

Further, the heat insulator 61 can be assembled to the bracket 41 by making use of a clamping force applied from the heat insulator 61 to the bracket 41. In this case, as shown in FIGS. 9A and 9B, the projection portion 41a3 and 41a4 which are provided on the bracket 41 in the above-described embodiment are removed, and the seating surfaces 41a1 and 41a2 are extended to the rear end surface of the bracket 41. Notably, in this case as well, the attachment portions 41b and 41c extend rightward and leftward from the rear end portion of the bracket 41 as in the above-described embodiment. The heat insulator 61 is configured in the same manner as in the above-described embodiment.

This modification has the following features. The bracket 41 is formed such that the vertical distance between the seating surfaces 41a1 and 41a2 increases toward the rack bar 21 side. The heat insulator 61 is formed such that the vertical distance between the flat surface portions 61b1 and 61c1 increases toward the rack bar 21 side. The angle θ1 formed between the flat surface portion 61b1 of the upper plate portion 61b of the heat insulator 61 and the flat surface portion 61c1 of the lower plate portion 61c thereof is set smaller than the angle θ2 formed between the upper and lower seating surfaces 41a1 and 41a2 of the bracket 41.

In the modification configured as described above, when an assembling force F1 is applied to the heat insulator 61 so as to move the heat insulator 61 rearward from the front side of the bracket 41 as shown in FIG. 9A, the upper and lower flat surface portions 61b1 and 61c1 of the heat insulator 61 move rearward, while sliding on the upper and lower seating surfaces 41a1 and 41a2 of the bracket 41. At that time, since the angle θ1 between the flat surface portions 61b1 and 61c1 is smaller than the angle θ2 between the seating surfaces 41a1 and 41a2, as shown in FIG. 9B, the heat insulator 61 generates an interfering force F2 (that is, a pinching force F2) for pinching the bracket 41 in the vertical direction, and receives a frontward releasing force F3 with which the heat insulator 61 is caused to move away from the bracket 41. The heat insulator 61 tends to stand still on the bracket 41 at a position at which these two forces F2 and F3 are balanced. Notably, at that time, a slight friction force also acts between the bracket 41 and the heat insulator 61.

Accordingly, when the above-mentioned assembling force F1 is applied to the heat insulator 61 to thereby push the heat insulator 61 rearward for a certain significant distance and is then removed, the heat insulator 61 returns forward. Then, the heat insulator 61 is fixed to the bracket 41 by means of the bolts 62 and 63 in a state where the forces F2 and F3 are balanced and the heat insulator 61 stands still on the bracket 41. Thus, the heat insulator 61 can be assembled to the bracket 41 at a consistent position. As a result, according to this modification as well, the accuracy of assembly of the heat insulator to the bracket 41 is improved, and the problem of interference between the heat insulator 61 and surrounding components, including the tie rods 31 and 32, can be solved.

Figure 10:
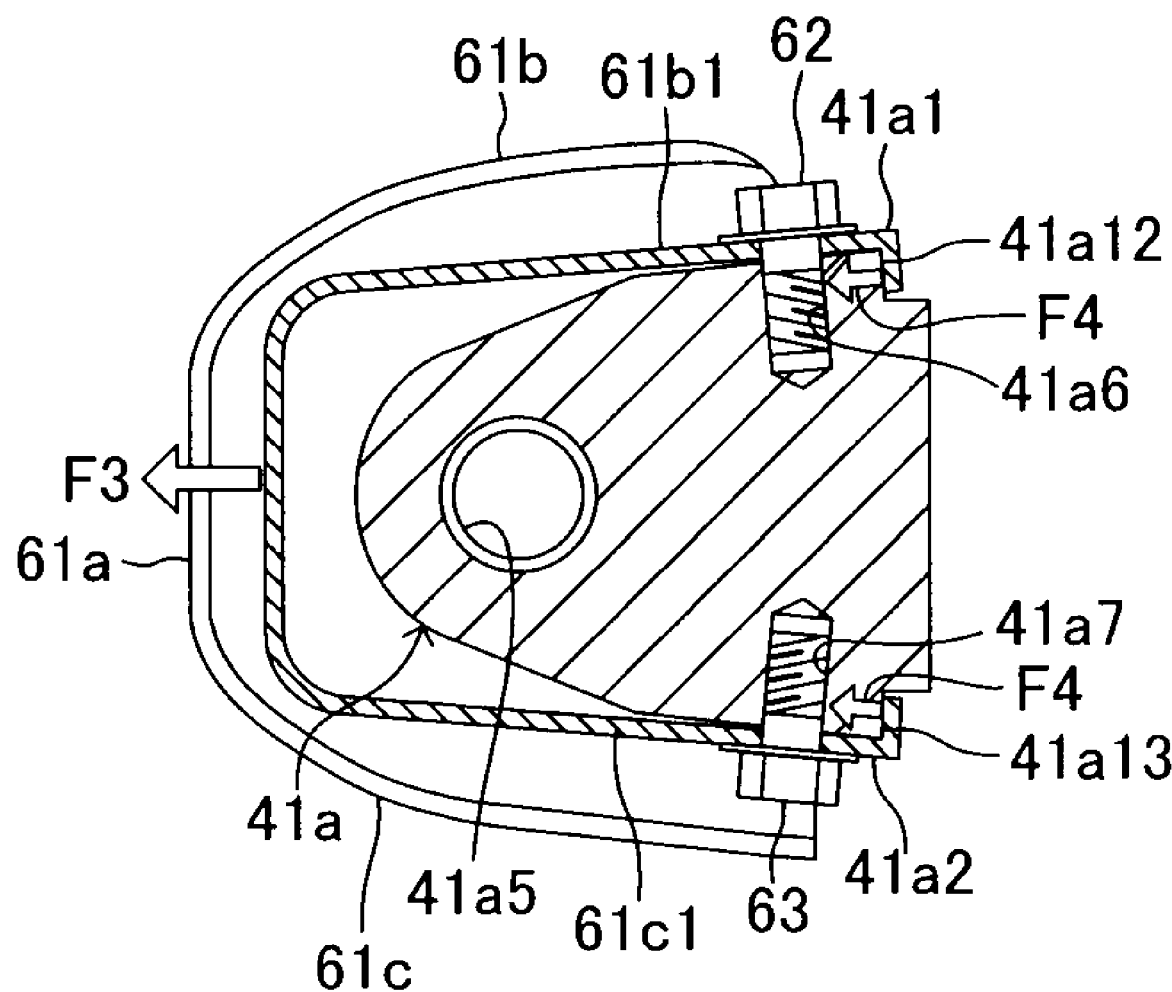
FIG. 10 is a vertical sectional view relating to another modification and showing a state after the heat insulator has been assembled to the bracket.

Further, the above-described embodiment may be modified as follows. In place of the projection portion 41a3 and 41a4, which are provided on the bracket 41 in the embodiment, as shown in FIG. 10, a step surface 41a12 is provided at the rear end of the bracket 41 in such a manner that the step surface 41a12 extends downward from the upper seating surface 41a1, and a step surface 41a13 is provided at the rear end of the bracket 41 in such a manner that the step surface 41a13 extends upward from the lower seating surface 41a2. In this case as well, through employment of a structure similar to that of the above-described modification, the angle θ1 between the flat surface portion 61b1 of the upper plate portion 61b of the heat insulator 61 and the flat surface portion 61c1 of the lower plate portion 61c of the heat insulator 61 is set smaller than the angle θ2 between the upper and lower seating surfaces 41a1 and 41a2 of the bracket 41.

In this case, a rearward assembling force is applied to the heat insulator 61 so as to move the heat insulator 61 rearward from the front side of the bracket 41 such that the rear end surfaces of the upper and lower flat surface portions 61b1 and 61c1 of the heat insulator 61 are located rearward of the rear end surfaces of the upper and lower seating surfaces 41a1 and 41a2 of the bracket 41. Subsequently, a rear end portion of the flat surface portion 61b1 is bent downward through crimping and brought into contact with the step surface 41a12 of the bracket 41, and a rear end portion of the flat surface portion 61c1 is bent upward through crimping and brought into contact with the step surface 41a13 of the bracket 41. Notably, the crimping positions of the rear end portions of the flat surface portions 61b1 and 61c1 are previously determined. In the state where the rear end portions of the flat surface portions 61b1 and 61c1 are crimped, the heat insulator 61 generates return forces F4 at the crimped portions as shown in FIG. 10.

As a result of generation of the return forces F4, the heat insulator 61 is accurately positioned in the front-rear direction in relation to the bracket 41. In this state, the heat insulator 61 is fixed to the bracket 41 by use of the bolts 62 and 63. Thus, according to this modification as well, the accuracy of assembly of the heat insulator 61 to the bracket 41 is improved, and the problem of interference between the heat insulator 61 and surrounding components, including the tie rods 31 and 32, can be solved.

Moreover, in the above-described embodiment and modifications, the upper and lower rear end portions of the heat insulator 61 are fixed to the upper and lower rear end portions, respectively, of the bracket 41. However, when the above-described problem of vibration and positioning of the heat insulator 61 to the bracket 41 can be solved, only one of the upper and lower rear end portions of the heat insulator 61 may be fixed to the upper or lower rear end portion of the bracket 41.

Further, in the above-described embodiment and modifications, the flat surface portions 61b1 and 61c1, which are formed by flattening portions of the upper plate portion 61b and the lower plate portion 61c of the heat insulator 61, are brought into close contact with the seating surfaces 41a and 41b, which are formed by flattening portions of the upper and lower surfaces of the bracket 41. However, the seating surfaces 41a and 41b of the bracket 41 and the portions of the heat insulator 61 corresponding to the flat surface portions 61b1 and 61c1 are not necessarily required to be made flat, so long as the above-mentioned portions of the heat insulator 61 and the seating surfaces 41a and 41b of the bracket 41 can be brought into close contact with each other. For example, the above-mentioned portions of the heat insulator 61 and the seating surfaces 41a and 41b of the bracket 41 may be formed to have an arcuate cross section or have a spherical surface, whereby the portions and the surfaces are curved.

Further, in the above-described embodiment and modifications, the heat insulator 61 having the connecting portion 61a, the upper plate portion 61ba, and the lower plate portion 61cb is integrally formed by means of bending a single metal plate. However, alternatively, the upper plate portion 61ba and the lower plate portion 61c may be formed separately, and then joined together. In this case, the upper plate portion 61ba and the lower plate portion 61cb may be formed of the same material or different materials.

Further, in the above-described embodiment, the inboard ends of the tie rods 31 and 32 are rotatably connected to the bracket 41 by use of the ball joint mechanisms 50A and 50B. Although use of the ball joint mechanisms 50A and 50B is preferred, the present invention can be widely applied to steering apparatuses for a vehicle in which the inboard ends of the tie rods 31 and 32 are rotatably connected to a central portion of the rack bar 21 via a coupler containing resin, rubber or the like, the tie rods 31 and 32 are caused to swing in accordance with a lateral movement of the rack bar 21, to thereby steer the left and right front wheels FW1 and FW2.

Specifically, for example, the present invention can be applied to a steering apparatus configured such that bolts are passed through cylindrical tubular portions formed at the inboard ends of the tie rods 31 and 32 and are fixed to the rack bar 21, and cylindrical tubular rubber bushes are disposed between the inner circumferential surfaces of the cylindrical tubular portions and the outer circumferential surfaces of the bolts. In this case, the heat insulator 61 covers the coupler, which contains the bolts, rubber bushes, etc., rearward from the front side thereof, in such a manner that, even when the rack bar 21 moves in the lateral direction so as to steer the left and right front wheels FW1 and FW2 or the inboard ends of tie rods 31 and 32 move in the vertical direction because of bound and rebound of the left and right front wheels FW1 and FW2, the heat insulator 61 can shut off radiant heat transfer from the engine and its auxiliary components toward the cylindrical tubular rubber bushes.

The invention claimed is:

1. A steering apparatus for a vehicle comprising:
a rack bar which extends such that its axial direction coincides with a lateral direction of the vehicle and which moves in the lateral direction in accordance with a steering operation of a steering wheel;
left and right tie rods which are connected at outboard ends thereof to left and right steerable wheels and which steer the left and right steerable wheels leftward and rightward by swing motions of the tie rods;
a coupler connected to a central portion of the rack bar with respect to the axial direction and having a pair of coupling portions to which inboard ends of the left and right tie rods are rotatably connected, respectively, the coupler moving in the lateral direction together with the rack bar so as to swing the left and right tie rods to thereby steer the left and right steerable wheels leftward and rightward; and
a heat insulator which is integrally formed to have an upper plate portion and a lower plate portion which are connected together at their ends located opposite the rack bar with respect to a front-rear direction and which face each other, the heat insulator being fixed to the coupler so as to cover the coupling portions to thereby shut off radiant heat transfer to the coupling portions from a heat source located forward of the coupler.

2. A steering apparatus for a vehicle according to claim 1, wherein the heat insulator is fixed to the coupler by use of a fixing member at a position determined such that the distance between the rack bar and that position is shorter than the distance between the rack bar and the coupling portions.

3. A steering apparatus for a vehicle according to claim 2, wherein the fixing member comprises bolts made of metal.

4. A steering apparatus for a vehicle according to claim 2, wherein
a flat seating surface portion is formed on at least one of the upper and lower surfaces of the coupler at a position located on the side toward the rack bar, and a flat surface portion is formed on at least one of the upper plate portion and the lower plate portion of the heat insulator at a central position with respect to the lateral direction; and
the heat insulator is fixed to the coupler by use of the fixing member in a state where an inside surface of the flat surface portion of the heat insulator is brought into close contact with the seating surface portion of the coupler.

5. A steering apparatus for a vehicle according to claim 2, wherein the heat insulator is fixed to the coupler at two positions located on the upper and lower sides, respectively, of the coupler.

6. A steering apparatus for a vehicle according to claim 2, wherein the heat insulator and the coupler are positioned by use of a pin at a position on the rack bar side in relation to the fixing member of the heat insulator.

7. A steering apparatus for a vehicle according to claim 1, wherein
a step portion is provided on at least one of the upper and lower surfaces of the coupler; and
a portion of an end surface of at least one of the upper plate portion and the lower plate portion of the heat insulator is brought into contact with an end surface of the step portion provided on the coupler.

8. A steering apparatus for a vehicle according to claim 7, wherein
the step portion provided on the coupler is formed such that the step portion has a raised portion on the rack bar side; and
a rack-bar-side end surface of at least one of the upper plate portion and the lower plate portion of the heat insulator is brought into contact with the end surface of the step portion provided on the coupler.

9. A steering apparatus for a vehicle according to claim 8, wherein
a groove extending in the front-rear direction is formed in the rack-bar-side raised portion of the step portion provided on the coupler;
a projection portion is provided on a rack-bar-side end surface of the heat insulator such that the projection portion projects toward the rack bar from a portion of the end surface; and
the projection portion of the heat insulator is inserted into the groove of the coupler, a left or right side surface of the projection portion is brought into contact with an inner wall of the groove, and the rack-bar-side end surface of the heat insulator, excluding the portion from which the projection portion projects, is brought into contact with the end surface of the step portion of the coupler.

10. A steering apparatus for a vehicle according to claim 7, wherein
the step portion of the coupler is constituted by a rectangular recess formed in the rack-bar-side raised portion such that the rectangular recess extends toward the rack bar side;
a rack-bar-side end portion of at least one of the upper plate portion and the lower plate portion of the heat insulator is formed into a rectangular shape; and
the rectangular end portion is inserted into the rectangular recess formed in the coupler, an end surface of the rectangular end portion of the heat insulator, the end surface being in parallel to the axial direction of the rack bar, is brought into contact with an end surface of the recess of the coupler, the end surface being in parallel to the axial direction of the rack bar, and one of opposite end surfaces of the rectangular end portion of the heat insulator, the end surfaces extending perpendicular to the axial direction of the rack bar, is brought into contact with one of opposite end surfaces of the recess of the coupler, the end surfaces extending perpendicular to the axial direction of the rack bar.

11. A steering apparatus for a vehicle according to claim 7, wherein
the step portion of the coupler is constituted by a groove which is formed at a rack-bar-side position and whose width decreases toward the rack bar;
a projection portion is formed at the rack-bar-side end portion of at least one of the upper plate portion and the lower plate portion of the heat insulator such that the width of the projection portion decreases toward the rack bar; and
the projection portion is inserted into the groove, and opposite side surfaces of the projection portion are brought into contact with opposite inside surfaces of the groove, respectively.

12. A steering apparatus for a vehicle according to claim 1, wherein the area of the upper plate portion of the heat insulator is rendered smaller than that of the lower plate portion of the heat insulator.

13. A steering apparatus for a vehicle according to claim 12, wherein the upper plate portion of the heat insulator assumes a shape formed by removing, from a rectangle, laterally opposite portions obliquely frontward, the portions being located on the side toward the rack bar; and the lower plate portion assumes a rectangular shape.

14. A steering apparatus for a vehicle according to claim 1, wherein
the coupler is formed such that a vertical distance between upper and lower seating surfaces of the coupler to which the heat insulator is attached increases toward the rack bar side;
the heat insulator is formed such that a vertical distance between the upper and lower plate portions increases toward the rack bar side; and
an angle formed between the upper plate portion and the lower plate portion of the heat insulator is smaller than an angle formed between the upper and lower seating surfaces of the coupler, in a state before the heat insulator is assembled to the coupler.

15. A steering apparatus for a vehicle according to claim 1, wherein a rack-bar-side end portion of at least one of the upper plate portion and the lower plate portion of the heat insulator is bent toward the coupler; and the bent portion is brought into contact with the rack-bar-side end surface of the coupler.

* * * * *